(12) United States Patent
Rieger

(10) Patent No.: US 7,441,368 B1
(45) Date of Patent: Oct. 28, 2008

(54) SENSOR TRIGGERED APPARATUS FOR CAPTURING PESTS

(76) Inventor: Stan Rieger, 30655 Groom Rd., Oakdale, CA (US) 95361

( * ) Notice: Subject to any disclaimer, the term of this patent is extended or adjusted under 35 U.S.C. 154(b) by 12 days.

(21) Appl. No.: 11/431,945

(22) Filed: May 9, 2006

Related U.S. Application Data (60) Provisional application No. 60/680,423, filed on May 10, 2005.

(51) Int. Cl.
A01M 1/06 (2006.01)
A01M 1/08 (2006.01)

(52) U.S. Cl. ............................................. 43/139

(58) Field of Classification Search ............... None
See application file for complete search history.

(56) References Cited

U.S. PATENT DOCUMENTS

| | | | | |
|---|---|---|---|---|
| 2,777,934 A * | 1/1957 | Falkenthal | ................ | 392/381 |
| 4,625,453 A * | 12/1986 | Smith | ................ | 43/139 |
| 4,733,495 A * | 3/1988 | Winnicki | ................ | 43/139 |
| 4,817,330 A * | 4/1989 | Fahringer | ................ | 43/133 |
| 5,040,326 A * | 8/1991 | Van Dijnsen et al. | ........... | 43/58 |
| 5,116,219 A * | 5/1992 | Zimmerman | ................ | 43/139 |
| 5,209,010 A | 5/1993 | Vickery | | |
| 5,222,322 A * | 6/1993 | Mastromonaco | ............. | 43/139 |
| 5,367,821 A * | 11/1994 | Ott | ................ | 43/139 |
| 5,402,598 A * | 4/1995 | Wade et al. | ................ | 43/139 |
| 5,417,009 A | 5/1995 | Butler et al. | | |
| 5,647,164 A | 7/1997 | Yates | | |
| 5,669,176 A | 9/1997 | Miller | | |
| 5,926,997 A * | 7/1999 | Wilcox | ................ | 43/60 |
| 6,108,863 A | 8/2000 | Lin | | |
| 6,202,343 B1 * | 3/2001 | Mah | ................ | 43/139 |
| 6,226,919 B1 * | 5/2001 | Septer | ................ | 43/139 |
| 6,286,249 B1 | 9/2001 | Miller et al. | | |
| 6,568,125 B2 * | 5/2003 | Kleinhenz | ................ | 43/139 |
| 6,640,489 B1 * | 11/2003 | Boulton | ................ | 43/139 |
| 6,925,752 B1 * | 8/2005 | Cherry et al. | ................ | 43/139 |
| 7,152,365 B2 * | 12/2006 | Wyers | ................ | 43/139 |
| 2002/0108296 A1 * | 8/2002 | Kleinhenz | ................ | 43/139 |
| 2003/0101638 A1 * | 6/2003 | Wyers | ................ | 43/139 |
| 2004/0107631 A1 * | 6/2004 | Wyers | ................ | 43/139 |
| 2005/0022444 A1 * | 2/2005 | Maddigan | ................ | 43/139 |
| 2005/0066570 A1 * | 3/2005 | Mosher et al. | ................ | 43/139 |
| 2005/0246944 A1 * | 11/2005 | Flowers | ................ | 43/139 |
| 2005/0246945 A1 * | 11/2005 | Evink | ................ | 43/139 |
| 2006/0248786 A1 * | 11/2006 | Wolf | ................ | 43/139 |

* cited by examiner

*Primary Examiner*—Kurt Rowan
(74) *Attorney, Agent, or Firm*—Thomas M. Freiburger (57) ABSTRACT

A trap for flies or other small insects or pests has an enclosure in which is normally maintained a static vacuum. A small opening, preferably with a cone-shaped corridor leading to the opening, has a closure door which when released will swing open and admit a high-velocity rush of air that will draw a fly from the corridor into the enclosure. A fly sensor, such as a motion detector or photodetector, determines the presence of a fly and relays this information to a CPU or a simply relay, which sends a signal to release a latch on the door, allowing the door to swing open. The enclosure's interior preferably includes an angled wall surface which the fly impacts at high enough speed to kill or stun the fly, and falls into a fly tray that can be pulled out for cleaning. A pest attractant such as a light or a smell attractant is included near the opening.

21 Claims, 6 Drawing Sheets

SENSOR TRIGGERED APPARATUS FOR CAPTURING PESTS

This application claims benefit of provisional application Ser. No. 60/680,423, filed May 10, 2005.

BACKGROUND AND SUMMARY OF THE INVENTION

The invention concerns traps for flies and other small pests.

The following prior art has some relevance to this invention: U.S. Pat. Nos. 6,286,249, 6,226,919, 6,202,343, 6,108,863, 5,669,176, 5,647,164, 5,417,009 and 5,209,010. Some of these patents disclose fans to intermittently create a flow of air, or the use of suction from vacuum cleaners, or generation of carbon dioxide as an attractant, or bottle-type traps using an outward flow of air to spread an attractant scent. None utilizes vacuum in the manner of the present invention described below.

One advantage of the invention is that it utilizes a static vacuum, as opposed to prior art devices using a continuous flow of air to overcome a pest. Methods of capturing pests which utilize a continuous flow of air waste electricity. My invention uses a finite amount of energy to create a static vacuum.

Another advantage of this invention is the speed at which it delivers its overwhelming burst of air to overcome the pest. Other patents demonstrate airflow initiated when the pest trips a sensor. This situation makes it possible for the pest to escape before enough air velocity is created.

Another advantage of the invention is that once the desired vacuum is achieved it remains silent until the pest is captured. Other inventions, for instance those utilizing a continuous airflow or electrifying grill, create a constant noise.

Another advantage of this invention is that it rids the user of the pest cleanly. The pest is efficiently captured within the cavity for easy disposal. The use of a fly swatter can leave behind debris, which can be unsightly, messy and unhealthy.

Another advantage is that the pests are captured and kept out of sight. Fly strips are very unsightly.

Another advantage of this invention is that it is non-toxic. Sprays and bait methods of pest control utilize various types of poison, which can be unknowingly ingested by humans or damage the environment.

Another advantage of this invention is the lack of suffering the pest must endure. It delivers its mortal blow to the pest with the speed of a fly swatter. One need not listen to the sound of a fly suspended on an electrode.

Another advantage of this invention is that it is designed so that it is easy to assemble, thus the components can be easily replaced if broken. These and other objects, advantages and features of the invention will be apparent from the following descriptions of preferred embodiments, considered along with the accompanying drawings.

DRAWINGS

List of Reference Numbers

| | | | |
|---|---|---|---|
| 10 | Fly Catching Apparatus | 12 | Housing |
| 14 | Lid | 16 | Housing Body |
| 18 | Screws | 19 | Cavity |
| 20 | Lid Gasket | 21 | Threaded Holes |
| 22 | Gasket Seat | 24 | Prefabricated Holes |
| 25 | Attached Lid Position | 26L | Optional Fly Block |
| 26R | Fly Block | 27 | Flight Path of Pest |
| 28 | Optional Corridor Spot | 30 | Corridor |
| 32 | Funnel | 34 | Portal |
| 36 | Electromagnetic Port/Door (EM Port/Door) | 38 | Door |
| 40 | Hinge | 42 | Electromagnetic Port (EM Port) |
| 44 | Wire | 46 | Light Attractant |
| 48 | Wire | 50 | Motion Detector |
| 52 | Wire | 54 | Flange |
| 56 | Passageway | 58 | Scent Duct |
| 60 | Scent Access | 62 | Scent Pore |
| 64 | Plug | 65 | String |
| 66 | Air Holes | 68 | Finger Guard |
| 70 | Threaded Protrusion | 72 | Gasket Seat |
| 74 | Corridor Access | 76 | Gasket |
| 78 | Ring Lid | 80 | σ (an angle) |
| 90 | Housing Plate | 92 | Central Processing Unit (CPU) |
| 94 | Pressure Sensor | 96 | Wire |
| 98 | Air Pump | 100 | Wire |
| 102 | Switch | 104 | Wire |
| 106 | One-Way Air Valve | 108 | Cord Gasket |
| 110 | Power Cord | 112 | Air Outlet |
| 114 | Power Plug | 116 | Screws |
| 118 | Prefabricated Holes | 120 | Housing Gasket |
| 122 | Threaded Holes | 124 | Housing Access |
| 130 | Cleanout Area | 132 | Threaded Protrusion |
| 134 | Cleanout Access | 136 | Tray |
| 138 | Tray Support | 140 | Handle |
| 142 | Cleanout Gasket | 144 | Cap |
| 146 | Gasket Seat | 148 | Fly Slide |
| 150 | Chute | | |

DESCRIPTION OF PREFERRED EMBODIMENTS

Figure 1:
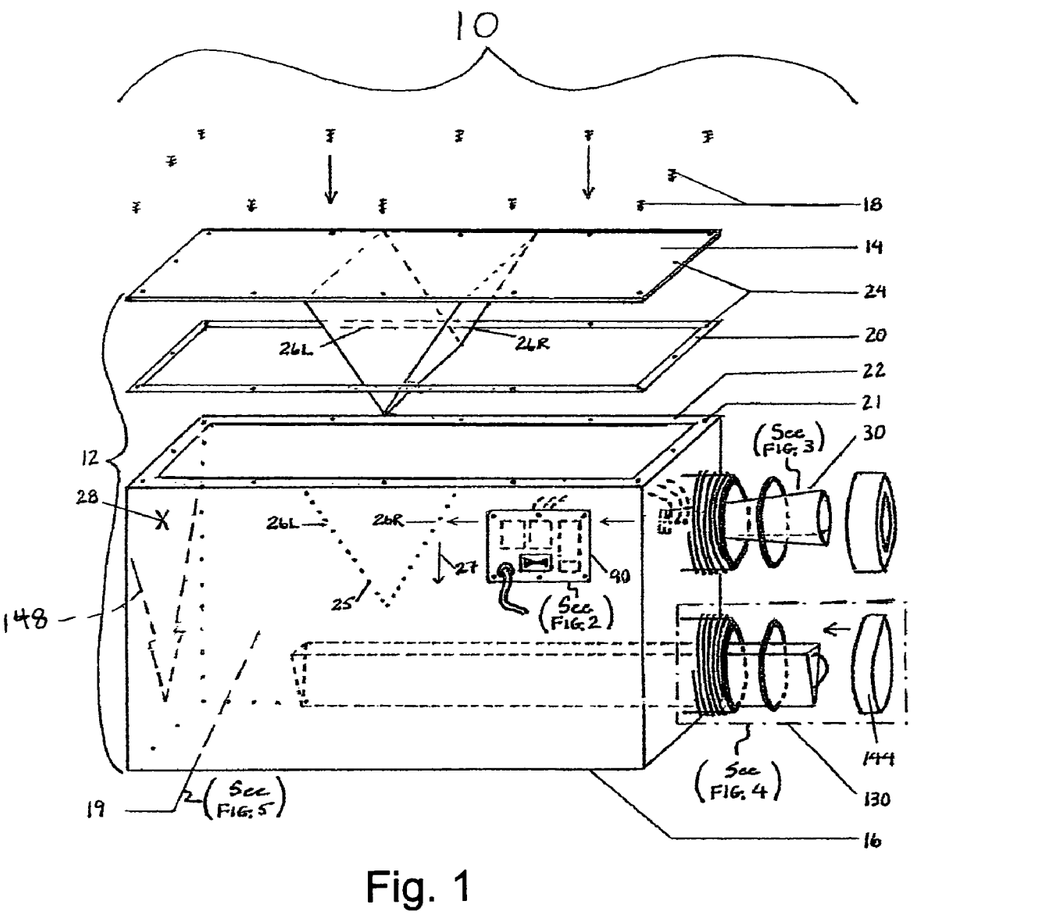
FIG. 1 is an overall perspective view of the present fly catching device.

FIG. 1 displays a perspective view of a fly catching apparatus 10. A housing 12 comprises a lid gasket 20 interfacing a lid 14 and a housing body 16 with a gasket seat 22, and with a multitude of screws 18 to form an airtight seal. A multitude of prefabricated holes 24 in lid 14 and lid gasket 20 enable screws 18 to fasten to a multitude of threaded holes 21.

Figure 2A:
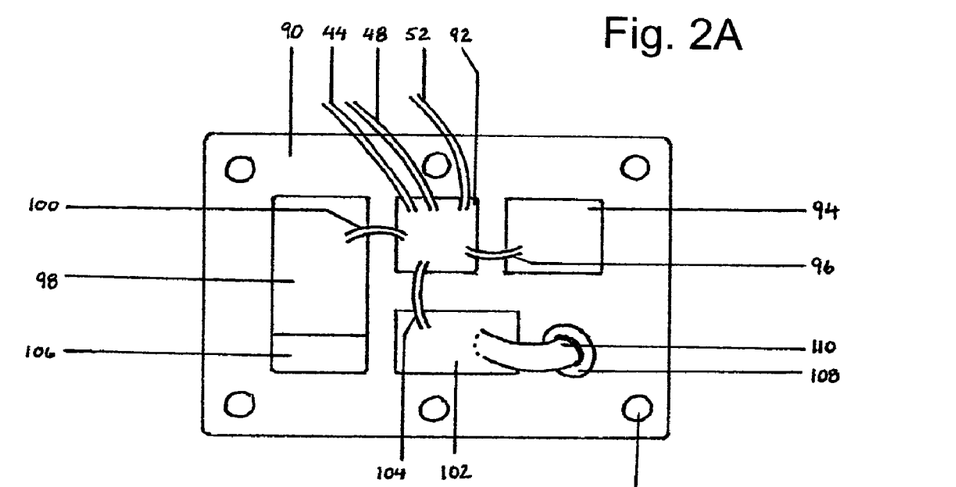
FIGS. 2A and 2B are interior and exterior views of a housing plate of the device.
Figure 2B:
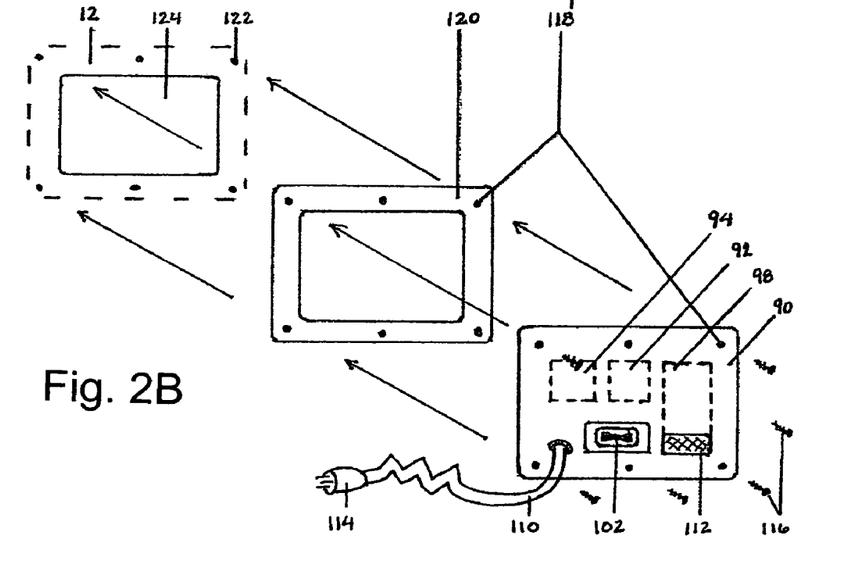

An interior view of a housing plate 90 is shown in FIGS. 2A and 2B. A central processing unit (CPU) 92 is connected to a pressure sensor 94 via a wire 96, to an air pump 98 via a wire 100 and to a switch 102 via a wire 104. Three other leads, a wire 44, a wire 48 and a wire 52 connect CPU 92 with components of a corridor 30 (described further below; see also FIGS. 3A and 3B). A one-way air valve 106 and air pump (vacuum pump) 98 are part of the same structure. A cord gasket 108 provides an airtight seal between a power cord 110 and housing plate 90.

FIG. 2B displays the exterior view of housing plate 90. An air outlet 112 provides an exit for air evacuated by air pump 98 through one-way air valve 106. A power plug 114 is attached to power cord 110. A multitude of screws 116 fasten housing plate 90 to housing 12 through a multitude of prefabricated holes 118 in housing plate 90 and in a housing gasket 120 to a multitude of threaded holes 122 such that components attached to housing plate 90 rest inside housing 12 facilitated by a housing access 124 and creates an airtight seal.

Figure 3A:
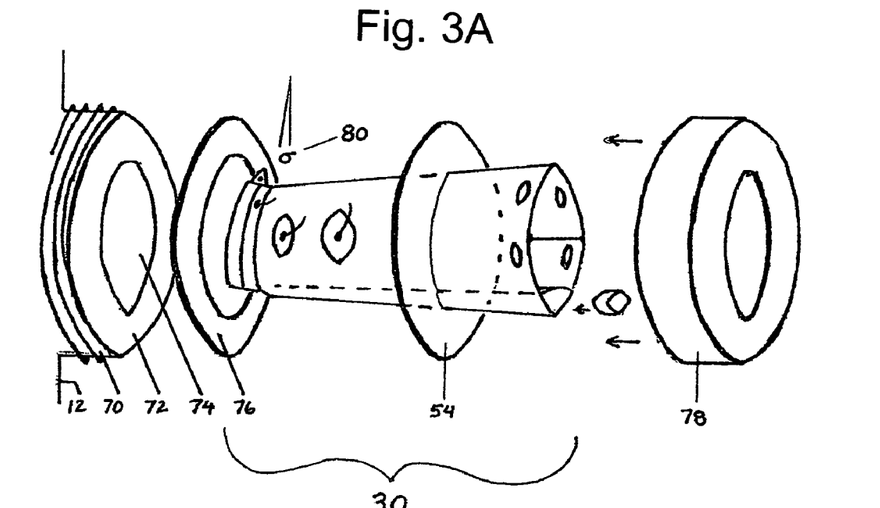
FIGS. 3A and 3B are lateral views (with FIG. 3A exploded) of a fly corridor and surrounding components of the device.
Figure 3B:
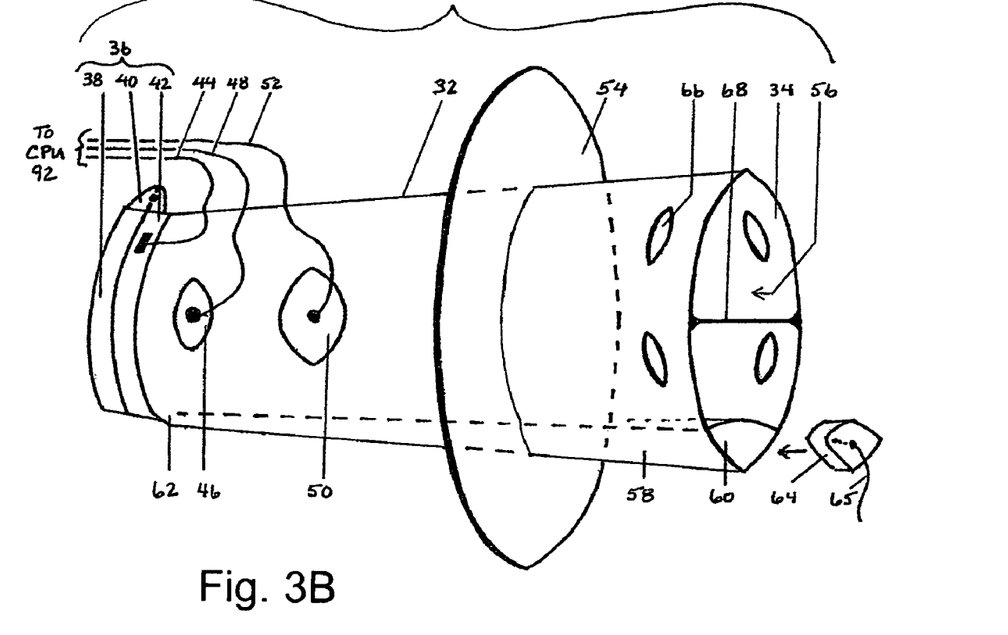

FIGS. 3A and 3B show corridor 30 and its comprising parts. A funnel 32 is a tapering cylinder or tube originating with a portal 34 and terminating with an electromagnetic port/door 36 (EM port/door 36). EM port/door 36 comprises a door 38 attached by a hinge 40 to an electromagnetic port 42 comprising an electromagnet (EM port 42). The electromagnet may be ring-shaped (ring magnet) as shown at 42. EM port/door 36 is attached to funnel 32 preferably by mechanical and adhesive means. The port 42 comprises an opening (not specifically shown) at the end of the funnel 32, an opening covered by the door 38 when closed and opening the housing to atmosphere when open. As shown, the hinge 40 is arranged that the door 38 opens upwardly and inwardly of the housing.

CPU 92 is connected to EM port 42 via wire 44, to an electric light attractant 46 via wire 48 and to a motion detector 50 via wire 52. The motion detector 50 serves as a fly sensor and could take other forms as noted below. A flange 54 is an extension of the outside of funnel 32. A passageway 56 is that area inside funnel 32 from portal 34 to EM port/door 36. A scent duct 58 is a chamber which runs parallel to passageway 56 within funnel 32 originating at a scent access 60 and terminating with a scent pore 62. A plug 64 fits scent access 60 and has a string 65 attached.

On funnel 32, proximate portal 34, are a series of air holes 66. A finger guard 68 spans portal 34. Finger guard 68 is a safety feature which acts to keep fingers out of passageway 56 and air holes 66 are a safety feature which allows air to pass by if someone decided to cup his hand over portal 34 and somehow trigger it.

FIG. 3A shows the relationship of corridor 30 to the surrounding components. Projecting from housing 12 is a threaded protrusion 70, which terminates with a corridor gasket seat 72 and encloses a corridor access 74. As corridor 30 is inserted into corridor access 74, flange 54 presses a gasket 76 to gasket seat 72 and forms an airtight seal as a female-threaded ring lid 78 is screwed onto threaded protrusion 70.

An angle σ 80 denotes that EM port/door 36 preferably is slightly angled to funnel 32, such that when door 38 hinges inwardly open, gravity alone would bring it back into contact with EM port 42.

Figure 4A:
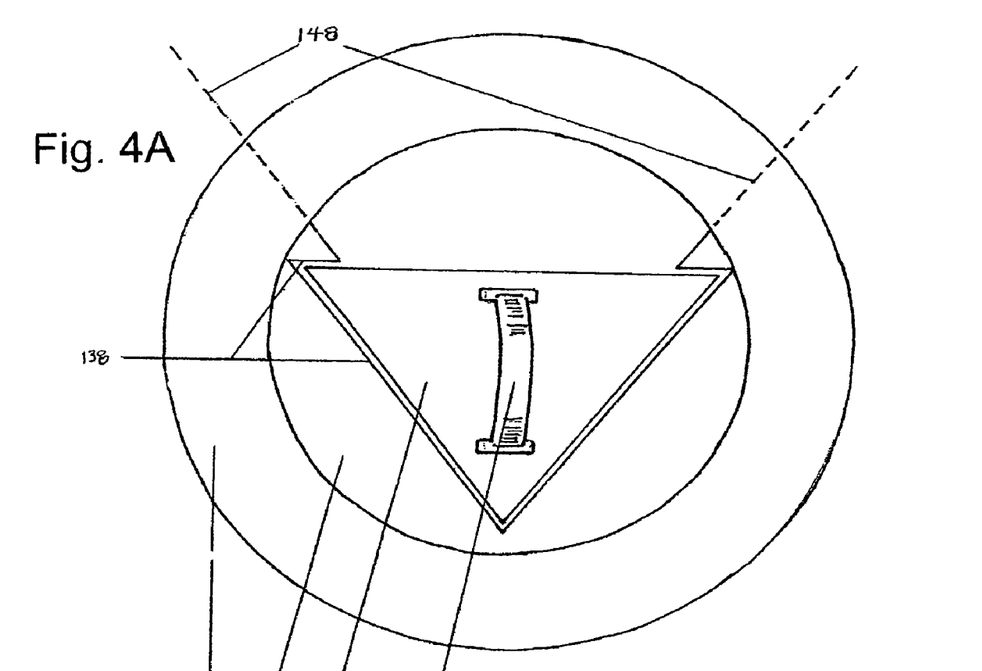
FIGS. 4A and 4B are straight on and perspective views showing a cleanout area of the device.
Figure 4B:
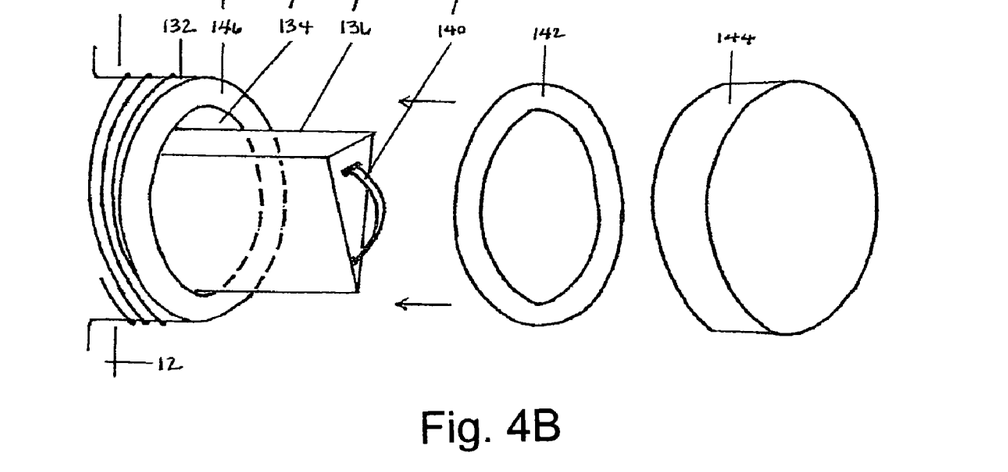

FIGS. 4A and B show a straight on view and an exploded lateral view of a cleanout area 130 (denoted by a dash-dot line in FIG. 1), respectively. From FIG. 4B we can see that a threaded protrusion 132, extending from housing 12, encloses a cleanout access 134. Cleanout access 134 allows for a tray 136, supported by a tray support 138 to slide in and out with the aid of a handle 140. A cleanout gasket 142 fits into a cap 144 (threads not in drawing), which when screwed to threaded protrusion 132 provides an airtight seal as gasket 142 is squeezed to a cleanout gasket seat 146.

In FIG. 4A we can see that tray support 138 starts just above the top outside edge of tray 136 and encompasses it such that it would be locked in place when cap 144 is attached.

Figure 5:
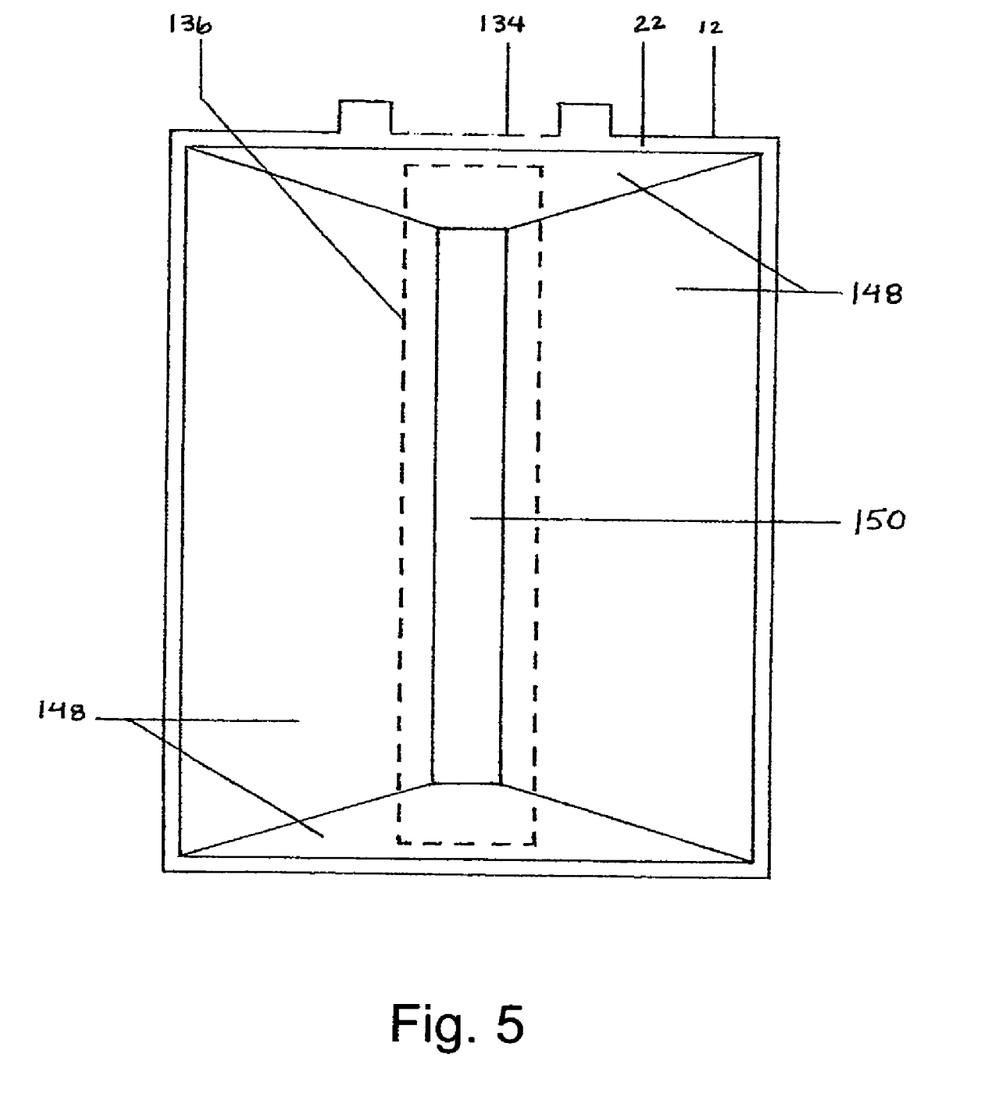
FIG. 5 is a straight down view of the interior of the housing.

As the horizontal inside portion of tray support 138 terminates and begins ascending, a fly slide 148 begins. FIG. 5 affords a straight down view of the interior of housing 12. The fly slide 148 is not shown in FIG. 1 for clarity in regard to other elements, but its outline is shown on the back wall of the housing in dashed lines at 148 in FIG. 1. The four interior walls of housing 12 comprise fly slide 148, which originates at gasket seat 22 and converges as it deepens terminating to form an opening or a chute 150. Anything that falls within housing 12 would meet fly slide 148 and fall into tray 136 or would fall into tray 136 unobstructed.

Housing body 16, along with the proper attachment of lid 14, corridor 30, housing plate 90 and cap 144 create an airtight cavity 19 in the housing's interior (airtight when EM port 42 is energized).

Figure 6:
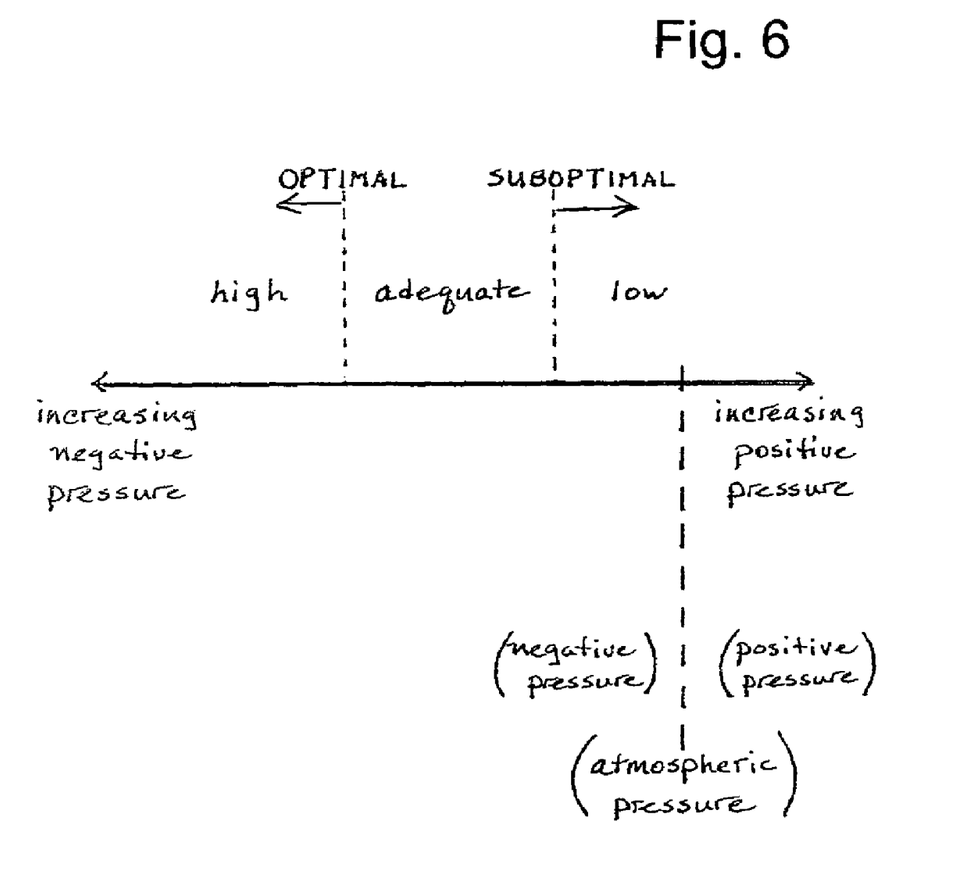
FIG. 6 is a graph depicting significant pressures and pressure ranges associated with the device.

The internal pressure of cavity 19 plays a key role as CPU 92 coordinates the events which will lead to the capture of a fly. Three pressure ranges, which shall be called high, adequate and low are significant to this invention. These three pressure ranges are divided by two distinct pressure readings, optimal and sub-optimal. FIG. 6 displays how these pressure ranges and reading are related.

Adequate is that range of negative pressure between, but not including, optimal and sub-optimal. All pressure readings within the range of adequate shall elicit no effect on the workings of this invention. That is, while the pressure reading is in the range of adequate, CPU 92 will not prompt any action to take place.

High is a range of pressure readings of optimal and greater in negative pressure. Low is that range of pressures that begin at sub-optimal and include readings of higher positive pressures. The range between high and low (adequate) is arbitrary and left to the manufacturer.

Likewise, pinpointing the exact values for optimal and sub-optimal is not pertinent to this description. These pressure values in effect represent a certain volume of air evacuated from cavity 19. These volumes will depend in large part on the geometry of funnel 32 and the exact location of motion detector 50 (addressed further in alternate embodiments). In general, higher vacuum will be required as evacuated volume of the enclosure is made smaller, in order to produce reliably the rush of air required (in velocity and volume) to pull a fly into the interior.

The critical measurement within the scope of this pressure scenario is that of sub-optimal. Sub-optimal represents the least amount of evacuated air necessary to capture a fly, taking all variables into account.

The user may opt to bait the device by placing an olfactory attractant into scent duct 58 prior to use or while the invention is in operation to further entice a fly into passageway 56.

The operation of this invention and the first situation finds the user plugging power plug 114 into an outlet and turning switch 102 to the on position (i.e. first time use, fly trap device was moved, etc). CPU 92 becomes charged and simultaneously energizes both EM port 42 (which makes cavity 19 now airtight) and pressure sensor 94.

Energized or activated, EM port 42 forms a bond with door 38, which shall be stronger than the force of optimal vacuum (optimal representing the greatest negative pressure which will pull upon the door). EM port 42 is constantly charged and its current only interrupted when motion detector 50 is tripped (more below, including variations).

Pressure sensor 94 is relentlessly reading the internal pressure of cavity 19 and CPU 92 is continually checking this reading. Naturally, in this case the initial reading will be the same as the pressure in the room, below sub-optimal or in the low vacuum/too-high pressure range. Thus, CPU 92 engages pump 98, which begins to evacuate air from cavity 19.

When enough air has been evacuated from cavity 19 so that the reading of optimal is attained, CPU 92 disengages air pump 98 and activates motion detector 50 and light attractant 46. The invention is now ready to catch a fly. Ideally no further air evacuation will be needed until a fly is caught, unless some air leakage occurs into the housing.

Because of the sensory attractants (or light attractant or some other reason), a fly passes through portal 34 and enters into passageway 56. As the fly nears EM port/door 36 it will come close to and trigger motion detector 50, which alerts CPU 92.

This message prompts CPU 92 to momentarily interrupt the current to EM port 42, acting as a fly response means, and preferably also to disable motion detector 50 as well as light attractant 46.

With this momentary loss of power to EM port 42, door 38 succumbs to the negative pressure within cavity 19 and rapidly flips inwardly open on its hinges. Air rushes in through passageway 56 to equalize the pressure of cavity 19 with that pressure surrounding the invention and carries the fly in with it.

Referring back to FIG. 1, a series of arrows represent the final flight path of the fly. The dotted lines at 25 represent the inverted triangular shape of the bottom of lid 14, as it would rest after attachment. A fly block 26R (FIG. 1) represents a spot on lid 14 which lines up with the center of passageway 56. As the fly hurls into cavity 19, it will ricochet off a spot proximate to fly block 26R and end up in tray 136.

This brings us to the other situation, that of the trap's resetting itself after capturing a fly. At this point motion detector 50 and light attractant 46 preferably have been disabled and power to EM port/door 42 is now re-established along with its bond to door 38. CPU 92 finds the enclosure pressure once again to be low vacuum (too-high pressure) and the above-described process begins again. Note that the pressure sensor could be independently connected to the vacuum pump and not to a CPU, if desired.

ALTERNATE EMBODIMENTS

Alternately this invention may be adapted and used to catch other pests such as mosquitoes, rodents or just about whatever bugs you in the realm of small animals. The word "fly" as used herein should be understood to include all such pests.

Multiple Corridors Referring back to FIG. 1, an "X" on the wall of housing 12, opposite corridor 30, marks an optional corridor spot 28, the center of which would line up with a fly block 26L. This is a possible location for a second corridor 30.

The complication which arises with the addition of a second corridor system (or greater multitude) is that of two flies simultaneously triggering the trap at two different corridors. The solution is a more advanced processor capable of differentiating the corridor and establishing a hierarchy whereby it would be constantly checking them in order such that only one corridor would in effect be active at any one given time. Furthermore, if one motion detector was triggered the corresponding EM port would react as described above and all motion detector and light attractants would be disabled until optimal was once again attained while maintaining the current to the rest of the EM port/door systems. Other arrangements can be implemented as well, such as simultaneous opening of two EM ports when two flies are present, division of the housing space into separate vacuum compartments (which could be with a single vacuum pump and one or more valves), etc.

The invention may be sold as a kit without the housing. A person may convert a 55-gallon barrel or any such object which can be made airtight into a fly catching trap.

Alternate sources of power (solar, battery, hand pump, etc.) may be utilized.

The apparatus may be designed to take on any desired shape.

The apparatus could be made with a carry handle.

The device may be produced in a color(s) which may be proven to attract the intended pest.

The fly block could be a flat surface instead of angled and may be eliminated altogether. It also could be incorporated into the corridor (or funnel).

The invention may be equipped with an external pressure gauge for visual reading.

Instead of having a string attached to the scent plug the end of the plug could be have a knob (oversized), it could have a screw-in design or some other convenient way of attachment.

With the use of superior engineering or a material more malleable than hard plastic the need for gaskets may be eliminated.

The pest removal tray may be eliminated.

The lid and other attachments to the housing body may be attached via other methods (snap devices, etc.).

The fly may come to rest in some kind of disposable bag or device such that the user need not see the remains to dispose of them.

Novelties such as a fly counter, or the playing of a melody upon the capture of a fly or any other indicator of capture may be incorporated.

An added safety feature may include a wire running inside of the finger guard, which would disable the invention should it be cut or broken.

The device could be designed such that it would fail to operate if the lid were not attached.

The invention may be designed without any pest attractants.

Heat (beyond that created by the light source) may also be incorporated as an attractant to entice a fly to enter the passageway. If a light source is used, it is advantageously a source producing a particular wavelength of light to which flies are attracted.

Alternate means of attaching the EM port to the funnel are possible (heat, screws, etc.). The EM port may be made part of the funnel.

The interior portion of funnel 32 may be coated with a substance that will reduce the friction coefficient.

The size and shape of the funnel may vary along with the position of the components.

It is not necessary to angle the EM port/door to the funnel.

The device may be equipped with a spring or utilize some other method to aid in closing the door.

The fly sensor 50 may be infrared, photo-sensor (photodetector), or radar or other fly presence sensor.

At the moment a fly is detected and power to the magnet at the EM port is interrupted, it is not necessary to disable power to the electric light attractant and the motion detector, since these elements will have no effect at this point. However, it is desirable to momentarily disable power to these elements, as well as the vacuum pump or pressure sensor, to conserve energy. Switching off the light gives a visual indication of a trapping event.

The CPU could be replaced by a simpler device such as a relay or other switch that interrupts power to the door closing device (or powers it in the case of a motor) when the sensor determines a fly is present. The vacuum pump or pressure sensor can similarly be disabled momentarily, although this is not absolutely necessary. The door preferably is open for a very short time, a fraction of a second, and the pump will not start to create any vacuum or air flow at the door opening prior to i.e. closing of the door. Note also that the pump in this device could operate continuously, although this is generally not desirable because of economy of operation, noise and vibration.

The ring magnet at the EM port could be a different form of magnet, such as a bar electromagnet, coupled with an effective gasket around the port, although the ring shaped magnet is preferred. The magnet could be built into or onto the door, thus comprising a part of the door. Also, another form of door latch and release could be utilized, such as a very small electric motor producing no discernable vibration. The door can be held and operated by any electromagnetic means, which includes a magnet, a solenoid, a motor or other electromagnetic device. A solenoid could withdraw a latch by direct or indirect mechanical connection, so as to release the door, then re-engage the latch when the door falls back to the closed position; a wedging action can be included. In the case of a motor, after the air rush which draws in the fly, the motor could again be energized upon door closure to re-latch the door tightly. The term "latch" is intended to include any form of device to hold the door closed.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A trap for flies or other small pests, comprising:
a housing defining an enclosure with an interior,
a vacuum pump connected to evacuate the interior of the enclosure and create a negative pressure in the enclosure, including a one-way valve so as to hold negative pressure, and including a pressure sensor sensing pressure in the enclosure such that the vacuum pump can be energized when negative pressure in the enclosure drops below a preselected level,
an opening in the housing and the enclosure to external atmosphere, with a door normally covering the opening in substantially sealed relationship so as to retain negative pressure in the enclosure,
electromagnetic means for latching the door closed and for releasing the door to open upon receipt of a release signal,
a fly sensor near the opening and exterior of the door, to sense the presence of a fly near the opening, and
fly response means connected to the fly sensor for sending a release signal to unlatch the door when the fly sensor detects a fly is present outside the enclosure and near the opening,
whereby when a fly appears near the opening of the enclosure the fly sensor determines the presence of the fly and this causes the fly response means to send the release signal to unlatch the door, causing a sudden rush of air from the exterior atmosphere through the opening and into the negative-pressure interior of the enclosure, pulling the fly into the interior of the enclosure.

2. The fly trap of claim 1, wherein the electromagnetic means comprises an electromagnet normally retaining the door closed over the opening.

3. The fly trap of claim 2, wherein the electromagnet comprises a ring magnet on a door opening frame, with the door including magnetic metal attracted by the ring magnet.

4. The fly trap of claim 2, wherein the electromagnet comprises a part of the door.

5. The fly trap of claim 1, wherein the fly sensor comprises a motion detector.

6. The fly trap of claim 1, wherein the fly response means comprises a central processing unit to which is connected the electromagnetic means and the fly sensor.

7. The fly trap of claim 6, wherein the release signal comprises interruption of power to the electromagnetic means, which comprises an electromagnet normally holding the door closed over the opening.

8. The fly trap of claim 1, wherein the release signal comprises interruption of power to the electromagnetic means, which comprises an electromagnet normally holding the door closed over the opening.

9. The fly trap of claim 1, wherein the door swings inwardly and opens when the electromagnetic means unlatches the door under the influence of air rushing into the enclosure.

10. The fly trap of claim 9, wherein the door swings upwardly and inwardly, such that the door returns by gravity to a position covering the opening when air ceases flowing into the enclosure, and wherein the electromagnetic means re-latches the door after the door returns to the closed position.

11. The fly trap of claim 10, wherein the opening includes a seat that is obliquely angled upwardly and inwardly of the enclosure such that gravity returns the door to a position against the seat upon ceasing of air flow into the enclosure.

12. The fly trap of claim 1, wherein the opening in the enclosure is relatively small so as to create a high velocity of air when the door is opened, and including a tube extending outwardly from the opening and door, away from the enclosure, forming a corridor to be entered by a fly.

13. The fly trap of claim 1, wherein the housing includes in the enclosure a wall surface in the path of air that rapidly rushes into the enclosure, the wall being positioned to be impacted by a fly as air rushes into the enclosure, to stun or kill the fly.

14. The fly trap of claim 13, wherein the wall surface is obliquely angled so as to direct the fly downwardly after impact.

15. The fly trap of claim 14, further including a fly trap beneath the obliquely angled wall surface, positioned to catch flies as they drop from the wall surface, and the fly trap being capable of pulling out from the housing for cleaning.

16. The fly trap of claim 1, further including an attractant positioned exterior to and near the opening.

17. The fly trap of claim 15, wherein the attractant comprises a substance that attracts flies by smell.

18. The fly trap of claim 16, wherein the attractant comprises an electric light.

19. The fly trap of claim 18, wherein the fly response means interrupts power to the light attractant and the fly sensor when the release signal is sent.

20. The fly trap of claim 1, wherein the fly sensor comprises a photodetector.

21. The fly trap of claim 1, wherein the opening into the enclosure is relatively small, and the housing including a corridor tube secured to a wall of the housing in sealed relationship, and wherein the corridor includes the opening and a door seat at the opening, the door being hinged to the corridor tube at the door seat so as to swing upwardly and inwardly when opened.

* * * * *